United States Patent
Smith

(10) Patent No.: US 7,563,100 B1
(45) Date of Patent: Jul. 21, 2009

(54) MOISTURE PROOF TELESCOPING COUPLER ASSEMBLY FOR ELECTRIC METAL TUBES

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 12/080,201

(22) Filed: Apr. 1, 2008

(51) Int. Cl.
 *H01R 41/00* (2006.01)
(52) U.S. Cl. .................................................. 439/33
(58) Field of Classification Search ............ 439/33, 439/31, 32, 100
 See application file for complete search history.

(56) References Cited

U.S. PATENT DOCUMENTS

| | | | |
|---|---|---|---|
| 268,686 A | 12/1882 | Kaiser | |
| 1,759,567 A * | 5/1930 | Dibner | 439/33 |
| 2,900,426 A | 8/1959 | Appleton | |
| 3,154,632 A | 10/1964 | Browne | |
| 3,204,988 A | 9/1965 | Ouderkirk | |
| 3,389,923 A | 6/1968 | Love, Jr. | |
| 3,454,291 A | 7/1969 | Goldsobel | |
| 3,885,821 A | 5/1975 | Philbert | |
| 3,951,436 A | 4/1976 | Hyde | |
| 3,976,314 A | 8/1976 | Graham | |
| 4,073,514 A | 2/1978 | Pote | |
| 4,091,523 A | 5/1978 | Rieche | |
| 4,304,424 A | 12/1981 | Hansen | |
| 4,438,954 A | 3/1984 | Hattori | |
| 5,141,258 A | 8/1992 | Stine | |
| 5,364,281 A * | 11/1994 | Leto | 439/100 |
| 5,466,890 A | 11/1995 | Stagnilti | |
| 5,654,526 A | 8/1997 | Sharp | |
| 6,106,031 A | 8/2000 | Guginsky | |
| 6,663,145 B1 | 12/2003 | Lyall et al. | |
| 6,715,803 B1 | 4/2004 | Pahl | |
| 6,765,143 B2 | 7/2004 | Kiely | |
| 7,111,873 B1 | 9/2006 | Cougle | |
| 2008/0102660 A1 * | 5/2008 | Wittwer | 439/100 |

OTHER PUBLICATIONS

O-Z/Gedney, Brochure, Expansion Fittings with Integral Bond, May 2007, 1 page.
Appleton, Brochure, Expansion Fittings with Integral Bond, May 2007, 1 page.
Thomas & Betts, Brochure, T&B Fittings, Undated, 1 page.
Appleton, Brochure, Rigid Metal Conduit Expansion Couplings, Sep. 2005, pp. 2 and 31.

* cited by examiner

*Primary Examiner*—Phuong K Dinh
(74) *Attorney, Agent, or Firm*—Fattibene and Fattibene; Paul A. Fattibene

(57) ABSTRACT

A moisture proof, telescoping coupler assembly for electric metal tubes with an enhanced grounding arrangement for electrically grounding the telescoping tube to the coupler body, and a modified arrangement thereof utilizing a snap fitting retaining ring for securing an electric metal tube to the coupler body to provide for unidirectional insertion of an electric metal tube into the open end of a coupler body in a manner that prohibits unintentional separation of the tube and/or retainer ring from the coupler body.

13 Claims, 4 Drawing Sheets

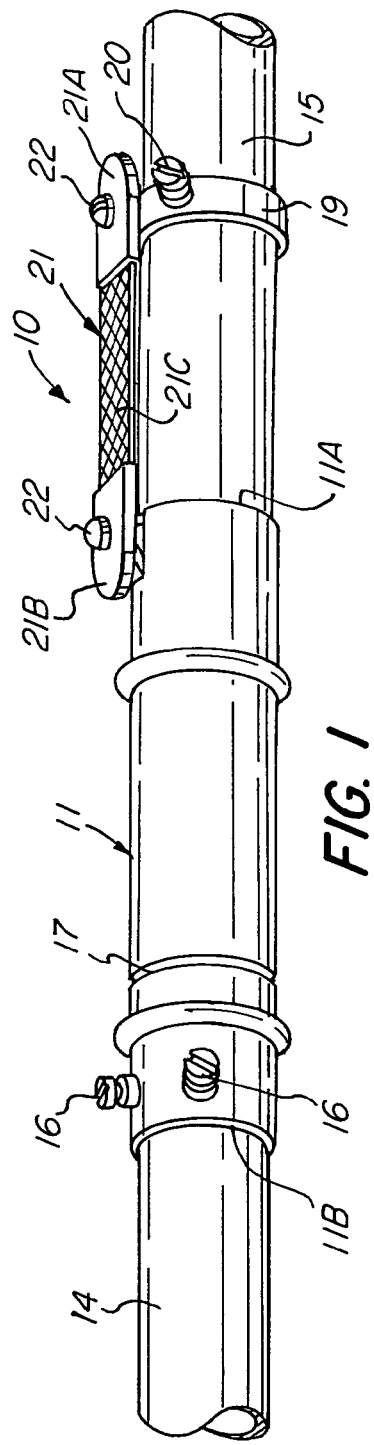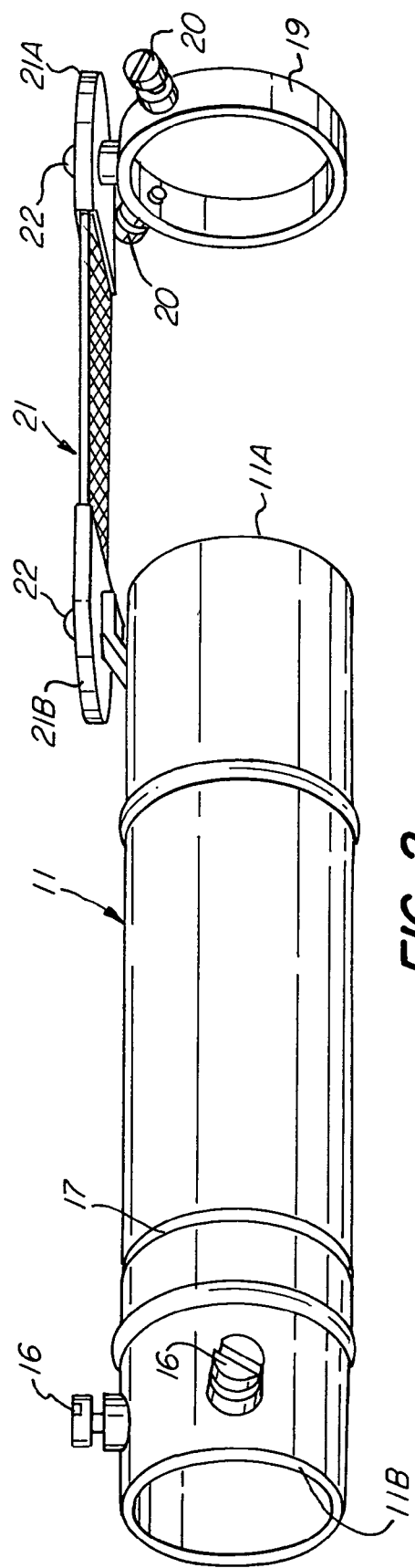

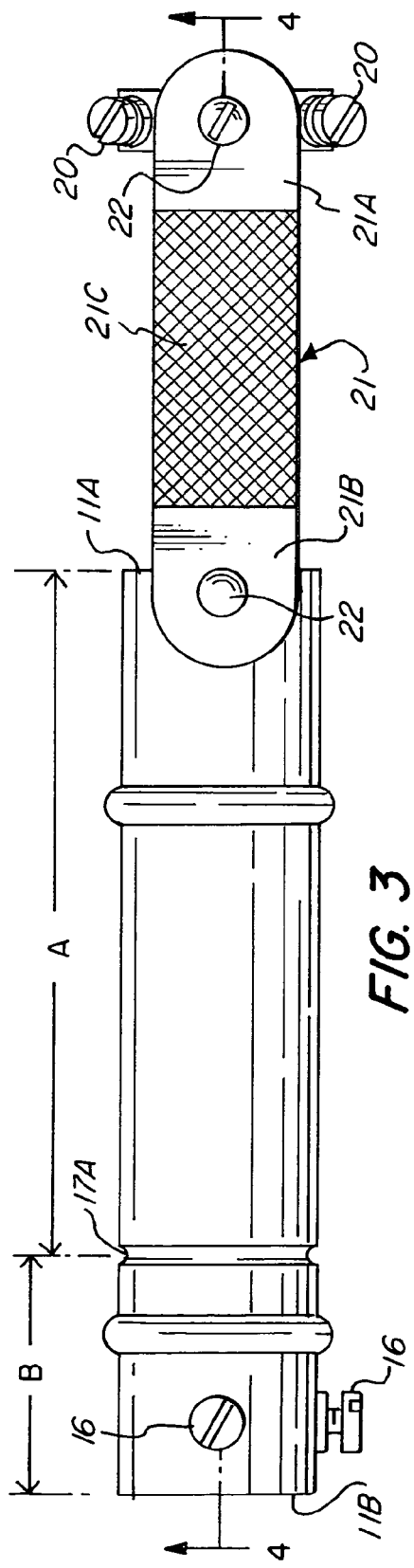
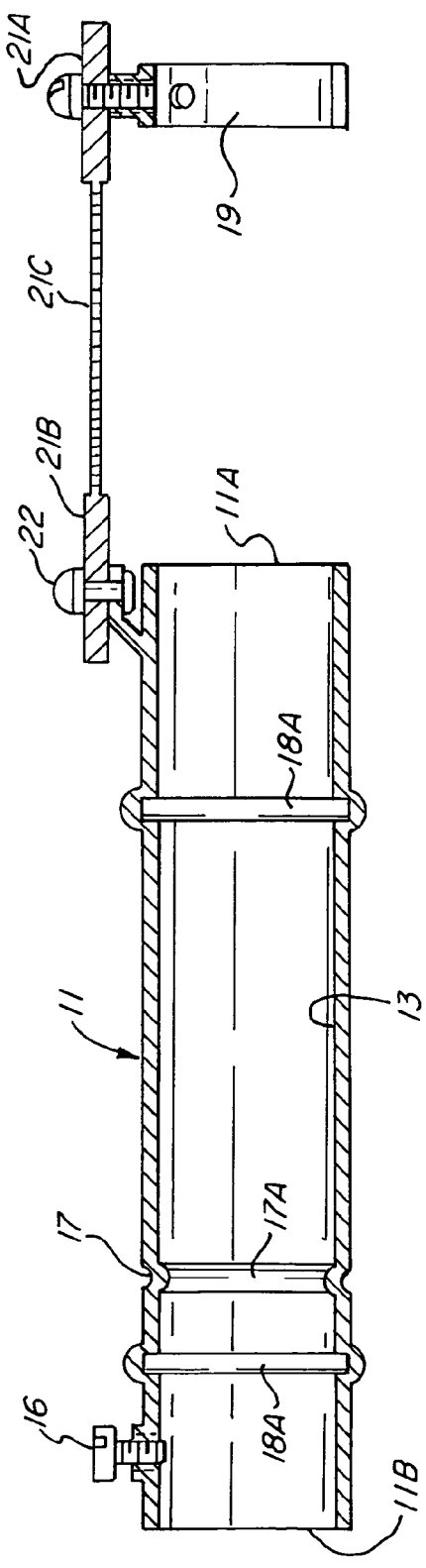
FIG. 3
FIG. 4

MOISTURE PROOF TELESCOPING COUPLER ASSEMBLY FOR ELECTRIC METAL TUBES

FIELD OF INVENTION

This invention is generally directed to an expansion or telescoping coupler assembly for electrical metal tubes and more specifically to a moisture proof telescoping or expanding coupler assembly with an enhanced electrical grounding arrangement for coupling an electric metal tube that is in relative sliding relationship to a coupler body.

BACKGROUND OF THE INVENTION

Heretofore, there exists various known types of coupler fittings for attaching an electric metal tube (EMT) to an electrical installation such as an electric box or panel or for joining at least two electrical metal tubes in an end-to-end relationship. Such known coupler assemblies include a coupler body to which the electrical metal tubes are rigidly connected to the coupler body, e.g. as disclosed in U.S. Pat. Nos. 268,686; 3,976,314; 4,073,514; 4,091,523. Other known coupler assemblies include a coupler body wherein at least one connected electrical metal tube is permitted to telescope or slide relative to the coupler body or relative to another electrical metal tube fixedly connected to the coupler body, e.g. as disclosed in U.S. Pat. Nos. 5,141,258 and 6,715,803.

With respect to such known sliding or telescoping coupler assemblies, it has been noted that because of the relatively free or sliding relationship between the moveable electrical metal tube relative to the coupler body, the optimal electrical grounding effect therebetween is substantially diminished because of insufficient contact between the complementary surfaces of the movable electrical metal tube and the associated coupler body due to the required tolerance necessary to permit the desired telescoping between the moveable electric tube and the associated coupler body. Thus, the optimum desired amount of the electrical grounding effect therebetween is not achieved.

SUMMARY OF INVENTION

It is therefore an object of the present invention to provide a coupler assembly that has a coupler body with and inlet end portion arranged for telescopically receiving an electric metal tube in sliding relationship relative thereto and wherein the optimum desired amount of an electrical grounding is achieved.

Another object is to provide a telescoping coupler assembly having an arrangement for prohibiting the seepage of moisture into the coupler assembly and the relative telescoping members.

Another object is to provide a telescoping coupler assembly having a coupler body for slidably receiving an electric metal tube connected thereto that is positively electrically grounded to the coupler body.

Another object is to provide a telescoping coupler assembly for electrical metal tubes which is relatively simple in structure, easy to manufacture, positive in operation, and moisture proof.

The foregoing objects and other features and advantages are attained by a telescoping coupler assembly that includes a coupler body for securing an electrical metal tube to an electrical structure such as an electrical box or panel or for connecting at least a pair of electrical metal tubes in end-to-end relationship wherein at least one of the electric metal tubes is rendered movable relative to the other. The coupler body includes a bore extending therethrough to define opposed open ends. One open end of the coupler body may be adapted to be fixedly connected to an electric box, panel, or adapted to receive another electric metal tube. The other open end of the coupler body for receiving an electric metallic tube is sized and shaped to telescopically receive an end portion of the electric metal tube for relative sliding or telescoping movement with respect thereto. The end of the coupler body adapted for securing the coupler body to an electrical box or panel may be formed to accommodate a lock nut or a snap fit adaptor such as disclosed in U.S. Pat. Nos. 6,555,750, 6,737,584, 6,916,688, 6,935,891 or other like patents. Alternatively, each of the opposed ends of the coupler body may be formed to snugly receive electric metal tube wherein one electric metal tube is fixedly secured to the coupler body by means of a fastener, and the other electric metal tube is telescopically mounted relative to the other end of the coupler body, as illustrated herein.

Connected adjacent to the end of the coupler body for receiving the telescoping tube is a grounding means that includes a grounding ring which is arranged to be slipped onto and fixedly secured to an end portion of the electrical metal tube telescopically fitted into the corresponding open end of the coupler body.

The grounding ring is connected to the coupler body by a wire mesh grounding strap of a predetermined length sufficient to provide for the relative sliding or telescoping movement of the moveable electric metal tube relative to the coupler body. The arrangement is such that the moveable electric metal tube is positively electrically grounded to the coupler body throughout its entire range of movement to provide for optimal electrical grounding between the coupler body and the associated telescoping electric metal tube.

Disposed within the bore of the coupler body are sealing rings for rendering the coupler assembly moisture proof without seriously limiting the relative sliding relationship between the telescoping electric metal tube and the associated coupler body.

BRIEF DESCRIPTION OF THE DRAWINGS

FIG. 1 is a perspective view of a telescoping coupler assembly for an electric metal tube embodying the present invention.

FIG. 2 is a perspective view of the coupler body, absent the moveable electric metal tubes.

FIG. 3 is a top view of FIG. 2.

FIG. 4 is a section view of the coupler body taken along line 4-4 on FIG. 3.

DETAILED DESCRIPTION OF THE INVENTION

Figure 5:
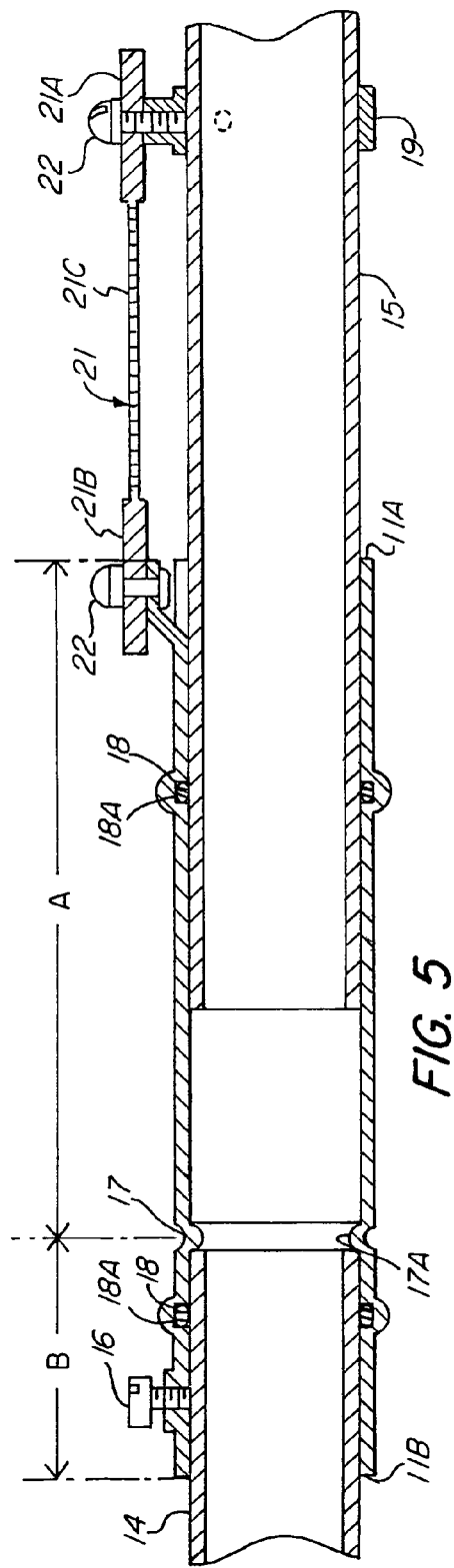
FIG. 5 is a longitudinal sectional view of the coupler assembly of FIG. 1.

Referring to the drawings there is illustrated in FIG. 1 a telescoping coupler assembly 10 embodying the invention. As shown, the coupler assembly 10 includes a coupler body 11 comprising an elongated tube or cylinder of a predetermined length defining a bore 13 extending therethrough that is opened at the opposed ends 11A, 11B of the coupler body 11. In the illustrated embodiment of FIG. 1 the coupler body 11 is configured to connect at least two electric metal tubes 14 and 15 in end-to-end relationship wherein one electric metal tube, e.g. tube 14, is arranged to be received within the end opening 11B of the coupler body 11 and fixedly secured thereto by means of suitable fasteners e.g. one or more set screws 16. The other electric metal tube 15 is adapted to be slidably received within the other open end 11A of the coupler body 11. The arrangement is such that tube 15 is rendered slidably or telescopically mounted within the open end 11A of the coupler body 11 to accommodate any protracting or retracting movement of the electric metal tube 15 relative to the coupler body 11 or the other metallic electric tube 14 fixedly connected to the coupler body 11.

As best seen in FIG. 4, the coupler body 11 is provided with a circumscribing inwardly projecting external groove 17 to define an internal stop shoulder 17A. The shoulder stop 17A functions to limit the distance that the fixed tube 14 may be inserted into the open end 11B of the coupler body 11 as noted in FIG. 5. As shown in FIG. 5, the stop shoulder 17A is located along the length of the coupler body 11 at a point closer to the end opening 11B than to end opening 11A. The arrangement is such that the longer portion A of the coupler body 11 to the right of the stop shoulder 17A has a length sufficient for the electric metal tube 15 to be telescopically mounted relative thereto so as to be slidably displaced therein as the tube 15 telescopes relative to the coupler body 11 so as to not allow the movable tube 15 to separate from the coupler body 11.

To prohibit any moisture or water from entering into the coupler assembly and the tubes connected thereto, the coupler body is provided with end seals 18-18. As shown at least two such end seals 18-18 are provided, one to either side of the stop shoulder 17A.

The seat 18A for accommodating the respective seals 18-18 is defined by a circumscribing internal grove 18A which is formed in any suitable manner, e.g. by swedging, pressure rolling or molding to deform the material of the coupler body as illustrated in FIG. 5. While the illustrated embodiment of FIG. 5 is described as having one seal 18 on opposite sides of the internal stop 17A, it will be understood that the number of such seals may be varied as required.

As shown in FIG. 1, the insertion of electric metal tube 14 into the opened end 11B of the coupler body 11 is limited by the internal stop 17A. With the tube 14 properly seated in the open end 11B of the coupler body 11, the tube 14 is fixedly secured thereto by means of a suitable fastener, e.g. set screw 16.

The slidable or telescoping tube 15 is inserted into the other open end 11A of the coupler body 11. The length A of the coupler body 11 is sufficient to permit tube 15 to be slidably disposed relative thereto without causing the tube 15 to be separated therefrom. In other words, the length A of the coupler body is greater than the maximum permitted linear displacement of the tube 15 within the coupler body 11.

Because tube 15 is slidably disposed within the coupler body 11, the coupler body is provided with a means for insuring the maximum optimizing of a positive electrical ground between telescoping tube 15 and the coupling body 11. In the illustrated embodiment, this is attained by a grounding ring 19 which is sized and shaped so as to be snugly fitted onto an end portion of the slidable or telescoping tube 15. Suitable fasteners such as set screws 20 fixedly secure the grounding ring 19 to the telescoping metal tube 15.

A grounding strap 21 connects the grounding ring 19 to the coupler body 11. A mounting plate 21A and 21B is connected to each end of the grounding strap 21 to provide the means whereby the grounding strap 21 is securely fixed to the grounding ring 21 and coupler body 11 by suitable fasteners, such as bolts or screws 22-22. Preferably the grounding strap portion 21C connected between the opposed end mounting plates 21A and 21B comprises a woven wire mesh strap 21C that renders the grounding strap 21 flexible for accommodating the telescoping or sliding movement of tube 15 relative to the coupler body. Thus the grounding strap 21 is free to flex or stretch in accordance with the linear or telescoping displacement of the electric metal tube 15 as the tube 15 telescopes or slides relative to the coupler body 11. In doing so, the grounding effect of the movable tube relative to the coupler body 11 is maximized throughout the entire telescoping range of the coupler assembly.

By providing seals 18 between the coupler body 11 and the respective associated electric tubes 14 and 15, the coupler assembly 10, described, also prohibits moisture or water from seeping into the coupler assembly 10 and the electrical tubes 14, 15 associated therewith.

While the embodiments illustrate the coupler body 11 having opposed end openings 11A, 11B of substantially equal diameters, it will be understood that the coupler body 11 may have opposed end openings with different sized diameters for connecting electric metal tubes of corresponding different diameters in end-to-end relationship.

It will also be noted that the short end B of the connector body 11 may be formed for accommodating a snap fit locking ring (not shown) of the type disclosed in U.S. Pat. Nos. 6,555,750, 6,737,584, 6,860,758, 6,935,891 and 6,916,988 and the like whereby one end of the coupler body 11 may be formed to be snap fitted or secured to an electronic box or panel in the manner described in the foregoing noted U.S. Patents which are incorporated by reference herein in the event it is desirable to couple a telescoping electric metal tube directly to an electric box or panel.

With the foregoing described structures it will be noted that the electrical grounding effect between the telescoping electric metal tube 15 and the coupler body 11 is rendered more positive than simply relying merely upon the sliding motion of the telescoping metal tube relative to the coupler body to produce the electrical ground effect, which may be problematic due to a space tolerance required between the sliding tube and the coupler body.

Figure 7:
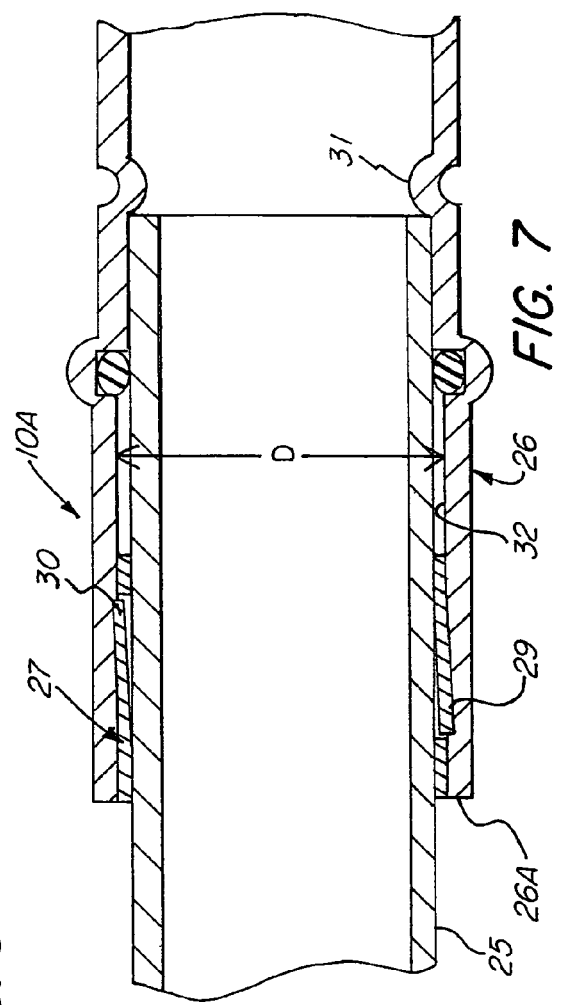
FIG. 7 is a fragmentary sectional view of a modified form of the invention utilizing the modified tube retainer of FIG. 6 wherein the limiting tang and retainer tang are shown in their operative positions.
Figure 6:
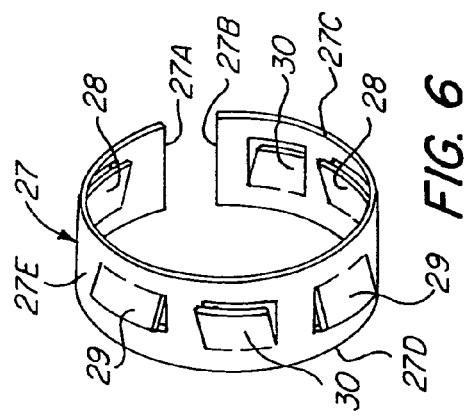
FIG. 6 is a detail perspective view of a modified tube retainer for fixedly securing an electric metal tube to the coupler body.
Figure 8:
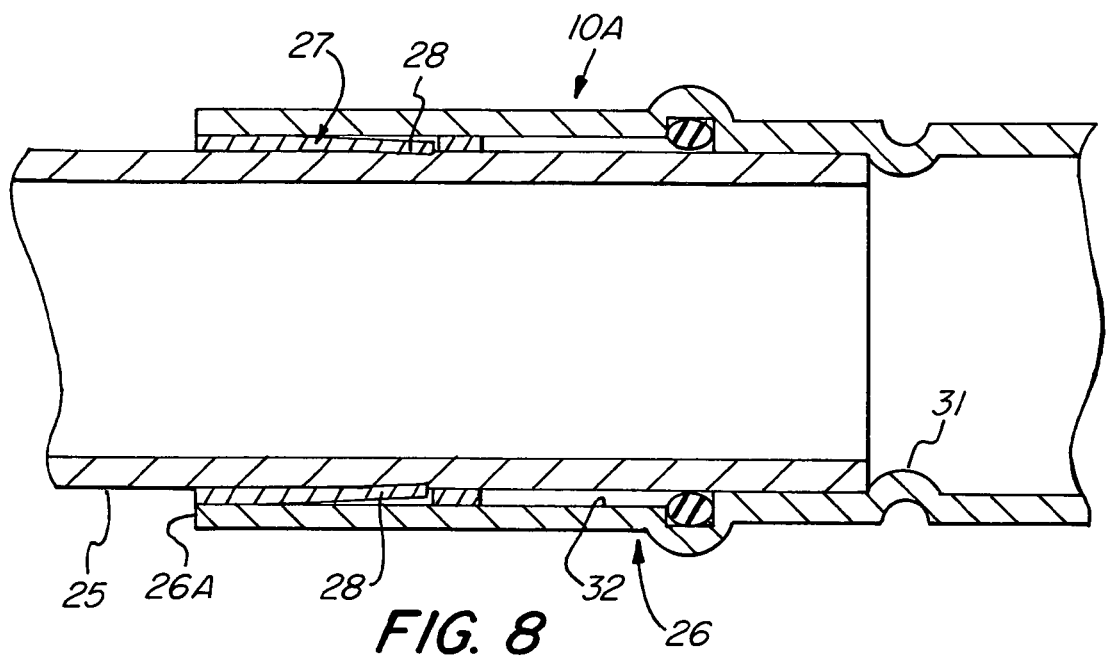
FIG. 8 is a sectional view similar to FIG. 7, wherein the tube retaining tang is shown in the operative position.

FIGS. 6 and 7 are directed to a modified form of the invention. The coupler assembly 10A is similar to the coupler assembly 10 herein described with the exception that the means for fixedly securing the fixed electric metal tube 25 to the coupler body 26 is achieved by a retainer ring 27 constructed to permit the fixed tube 25 to be snap fitted into one end 26A of the coupler body 26 that will also resist any unintentional separation of the fixed tube 25 from the coupler body 26 by an unintentionally applied force tending to cause separation of the fixed tube 25 from the coupler body 26.

As illustrated in FIG. 6, the retaining ring 27 is preferably formed of spring steel with a circular configuration capable of being inserted into the end opening 26A of the coupler body 26. In the illustrated embodiment, the retaining ring 27 has its opposed ends 27A and 27B slighted spaced apart to form a split ring. As the material of the retainer ring 27 is formed of spring steel, the described retainer ring 27 has an inherent resiliency which in its relaxed state is provided with an outer diameter that is slightly greater than the internal diameter D of the open end 26A of the coupler body 26.

Referring to FIG. 6, the split ring retainer 27 is provided with a leading edge 27C, a trailing edge 27D, and a plane surface 27E therebetween. Blanked or formed out of the plane surface 27E are one or more tube retaining tangs, 28, one or more locking tangs 29, and one or more limit tangs 30. As shown in FIG. 6 the tube retaining tangs 28, the locking tangs 29 and limit tangs 30 are alternating and circumferentially spaced about the circumference of the retaining ring 27.

The tube retaining tangs 28 are inwardly bent out of the plane surface 27E and are inclined or angled in the direction of the leading edge 27A of the retainer ring 27. The locking tangs 29 are outwardly bent relative to the plane surface 27E of the retainer ring 27 and are oppositely inclined or angled toward the trailing edge 27D of the retainer ring 27. The limit tangs 30 are also blanked or formed out of the plane surface and outwardly bent relative to the plane surface 27E and are angled or inclined toward the leading edge of the retaining ring 27.

As illustrated in FIG. 7, the retainer ring 27 being split may be compressed to permit the retainer ring 27 to be inserted into the open end 26A of the coupler body 26. The arrangement is such that with the retainer ring in its compressed state when inserted into the end opening 26A, will cause the outwardly bent limit tang 30 to engage an internal surface portion of the coupler body upon the removal of the compressing force thereon to limit the distance the retainer ring 27 may be inserted into said end opening 26A.

Upon releasing the compression force acting on the retainer ring 27, the inherent resiliency of the split retainer ring 27 will cause the diameter of the retainer ring 27 to expand with a sufficient force to fixedly secure the retainer ring 27 within the end opening 26A whereby the outwardly bent locking tangs 29 will impart an additional "bite" force against the inner surface of the end opening to resist any unintentional pull out force that may be applied on the retainer ring.

With the retainer ring 27 frictionally secure within the open end 26A of the connector body 26, as above described, the arrangement is such that the electric metal tube 25 can be fixedly secured to the end opening 26A of the coupler body 26 by simply pushing the end portion of electric tube 25 into the end opening 26A and through the retainer ring 27 until the end of the tube 25 engages the internal stop 31. As the end of the electric metal tube 25 passes through the retainer ring 27 the tube retaining tangs 29, which are inwardly bent as described herein, will inherently exert a holding or biting force on the electric metal tube sufficient to resist an unintentional pulling force imparted onto the electric metal tube 25. In all other respects, the embodiment disclosed and described with the embodiment of FIGS. 6 and 7 is similar to the embodiments herein before described with respect to FIGS. 1 to 5.

The locking tangs 29, being outwardly bent, are sufficiently resilient so as to flex inwardly permitting the retainer ring to also pass through the end opening 26 of the coupler body 26 and spring outwardly, when ring 27 is fully seated, to bite into the internal surface of the bore of the coupler body to resist or prohibit unintentional separation of the retaining ring 27 from the coupler body in the assembled position.

With the retainer ring 27 described, installation of the electric metal tube 25 to the coupler body 26 may also be effected by positioning the retaining ring 27 onto the end of the electric metal tube 25, and then inserting the electric metal tube with the retainer ring 27 secured thereto into the end opening 26A of the coupler body 26 until the end of the tube engages the stop shoulder 30 as noted in FIG. 7. In this assembled position, as seen in FIG. 7, the tube retaining tangs 28, which are inwardly bent and inclined in the direction of the leading edge 27C of the retaining ring 27, are bias to exert a biting force onto the metal tube 26 with a force sufficient to prohibit unintentional separation of the tube 25 therefrom. At the same time the outwardly bent locking tangs 29, inclined in the direction of the trailing edge 27D, will exert a biting force onto the internal surface of the bore 32 to resist unintentional withdrawal of the retainer ring 27 and the associated tube 25 from the open end 26A of the coupler body 26.

While the invention has been described with respect to the described embodiments, other variations and modifications can be made without departing from the spirit or scope of the invention.

What is claimed is:

1. An electric metal tube coupler assembly comprising:
   a coupler body having a bore extending therethrough and having opposed end openings,
   an electric metal tube,
   said electric metal tube having an end portion adapted to be slidably received in one of said end openings,
   an inwardly extending stop means disposed within said bore between said opposed end openings,
   a sealing means disposed in said one end opening circumscribing said end portion of said electric metal tube, slidably disposed within said one end opening,
   a grounding ring connected to said electric metal tube, and
   a flexible grounding strap interconnecting said grounding ring to said coupler body.

2. An electric metal tube coupler assembly as defined in claim 1 and including:
   a second electrical metal tube adapted to be fitted into the other end opening of said coupler body,
   a second sealing ring circumscribing the end of said second electric metal tube within said other end opening, and
   means for fixedly securing said second electrical tube to said other end opening.

3. An electric metal tube coupler assembly as defined in claim 2 wherein said securing means includes a screw fastener.

4. An electric metal tube coupler assembly as defined in claim 2 wherein said securing means comprises:
   a retainer ring formed of spring steel adapted to be fitted to said other end opening,
   said retainer ring having a leading edge, a trailing edge and a planar portion therebetween,
   and first means formed out of said planar portion for permitting said second electrical metal tube to be unidirectionally inserted thereto.

5. An electrical metal tube coupler assembly as defined in claim 4 wherein said retainer ring comprises a split ring having normal relaxed state and a compressed state, the diameter of said retainer ring in the relaxed state being greater than the diameter of said retainer ring in the compressed state.

6. An electrical metal tube coupler assembly as defined in claim 5 wherein said retainer ring includes:
   a second means formed out of said planer portion of said retainer ring for locking said retainer ring within said other end opening.

7. An electrical metal tube coupler assembly as defined in claim 4 wherein said first means include a tube retaining tang formed out of the plane of said planar portion being inwardly bent and angularly sloped in the direction of said leading edge whereby the free end of said tube retaining tang exerts a holding force on said second tube to prohibit unintentional separation of said second electric metal tube from said other end opening of said coupler body.

8. An electric metal tube coupler assembly as defined in claim 6 wherein said second means comprises a locking tang blanked out of the plane of said tube retainer ring, said locking tang being outwardly and angularly sloped in the direction of said trailing edge of said retainer ring whereby said locking tang secures said retainer ring within said other end of said coupler body.

9. An electric metal tube coupler assembly as defined in claim 6 wherein said first means includes a tube retaining tang formed out of the plane of said planar portion being inwardly bent and angularly sloped in the direction of said leading edge whereby the free end of said tube retaining tang exerts a holding force on said second tube to prohibit unintentional separation of said second electric metal tube from said other end opening of said coupler body, said second means comprises a locking tang blanked out of the plane of said tube retainer ring, said locking tang being outwardly and angularly sloped in the direction of said trailing edge of said retainer ring whereby said locking tang secures said retainer ring within said other end of said coupler body.

10. An electric metal tube coupler assembly as defined in claim 9 and including:

means for limiting the insertion of said tube retaining ring within said other end opening.

11. An electric metal tube coupler assembly for joining at least a pair of electric metal tubes in end-to-end relationship comprising:

a metallic coupler body having opposed end openings, a bore extending through said coupler body in communication with said opposed end opening, a first electric metal tube having an end portion telescopically mounted within one of said end openings in relative sliding relationship to said one end opening, an internal tube stop means disposed about the inner surface of said bore, a second electric metal tube having an end portion adapted to be fitted into the other as said end openings of said coupler body, means for fixedly securing said end portion of said second electric metal tube to the other end of said openings, a sealing means circumscribing each of said end portion of said electrical metal tube disposed within each of said opposed end openings, each of said end openings having an internal seal disposed on opposite sides of said tube stop for retaining said sealing means therein, an electrical grounding means for electrically grounding said first electric metal tube to said metallic coupling body, said ground means including a grounding ring fixedly secured to said first electric metal tube externally of said coupler body, and said flexible grounding strap being formed of a braided wire mesh interconnecting said grounding ring to said coupler body adjacent to said one end opening.

12. An electrical metal tube coupler assembly as defined in claim 11 wherein said means for fixedly securing said second electric metal tube to said second end opening comprises:

a retainer ring formed of spring steel having the configuration of a circular arc of less than 360° which in its normal relaxed state has a diameter which is greater than the diameter of said retainer ring in its compressed state, said retainer ring having a leading edge, a trailing edge and a planar portion therebetween, and a tube retainer tang blanked out of said planer portion of said tube a retaining tang having a free end inwardly bent and angularly inclined in the direction of said leading edge, and a locking tang blanked out of said planer portion, said locking tang having a free end outwardly bent relative to said planar portion and angularly inclined in the direction of said trailing edge.

13. An electrical metal tube coupler assembly as defined in claim 12 and including a plurality of said tube retaining tangs and said locking tangs, circumferentially and alternatively spaced about the periphery of said retainer ring.

\* \* \* \* \*